United States Patent
Zhou et al.

(10) Patent No.: US 10,563,638 B2
(45) Date of Patent: Feb. 18, 2020

(54) WIND POWER GENERATION GROUP COOLING SYSTEM DESIGN METHOD AND COOLING SYSTEM FOR HARSH ENVIRONMENT

(71) Applicant: CSIC HAIZHUANG WINDPOWER CO., LTD., Chongqing (CN)

(72) Inventors: Zutian Zhou, Chongqing (CN); Wanjun Zhang, Chongqing (CN); Youchuan Tao, Chongqing (CN); Lulin Ning, Chongqing (CN); Yajun Wang, Chongqing (CN); Jinyu Huang, Chongqing (CN)

(73) Assignee: CSIC HAIZHUANG WINDPOWER CO., LTD., Chongqing (CN)

( * ) Notice: Subject to any disclaimer, the term of this patent is extended or adjusted under 35 U.S.C. 154(b) by 275 days.

(21) Appl. No.: 15/533,292

(22) PCT Filed: Feb. 4, 2016

(86) PCT No.: PCT/CN2016/073513
§ 371 (c)(1),
(2) Date: Jun. 5, 2017

(87) PCT Pub. No.: WO2016/138812
PCT Pub. Date: Sep. 9, 2016

(65) Prior Publication Data
US 2018/0266398 A1    Sep. 20, 2018

(30) Foreign Application Priority Data
Mar. 5, 2015 (CN) .......................... 2015 1 0097596

(51) Int. Cl.
*F03D 9/00* (2016.01)
*F03D 80/60* (2016.01)
(Continued)

(52) U.S. Cl.
CPC ............... *F03D 80/60* (2016.05); *F03D 9/25* (2016.05); *F03D 80/80* (2016.05); *F03D 80/88* (2016.05);
(Continued)

(58) Field of Classification Search
CPC .......... F03D 80/60; F03D 80/80; F03D 80/88; F03D 9/25; Y02E 10/726
See application file for complete search history.

(56) References Cited

U.S. PATENT DOCUMENTS 6,492,743 B1    12/2002 Appa
2010/0061853 A1    3/2010 Bagepalli
(Continued)

FOREIGN PATENT DOCUMENTS

CN    201347842 Y    11/2009
CN    201386630 Y    1/2010
(Continued)

OTHER PUBLICATIONS

English Translation of the 1st Office Action for CN201510097596.6, dated Feb. 22, 2017.
(Continued)

*Primary Examiner* — Hai H Huynh
*Assistant Examiner* — Gonzalo Laguarda
(74) *Attorney, Agent, or Firm* — Yue (Robert) Xu; Apex Attorneys at Law, LLP

(57) ABSTRACT

A design method of a heat dissipation system of a wind generator system for severe environments includes constructing an outer air duct of the heat dissipation system; determining a suction air amount of the outer air duct; setting an air velocity of an air inlet of the outer air duct; determining an area of the air inlet of the outer air duct; providing the air inlet; and designing a settling chamber. With these steps, the original heat dissipation system of the
(Continued)

wind generator system is additionally provided with the outer air duct. Further, the area of the air inlet is controlled to allow the air velocity at the air inlet to be 3 m/s to 4 m/s, thus rare or no suspended substances are suctioned into the outer air duct, and the radiators of the original heat dissipation system suction cooling air from the outer air duct.

10 Claims, 1 Drawing Sheet

(51) Int. Cl.
*F03D 80/80* (2016.01)
*F03D 9/25* (2016.01)
(52) U.S. Cl.
CPC ....... *F05B 2260/221* (2013.01); *Y02E 10/725* (2013.01); *Y02E 10/726* (2013.01); *Y02T 50/675* (2013.01)

(56) References Cited

U.S. PATENT DOCUMENTS

| | | | |
|---|---|---|---|
| 2010/0066088 A1* | 3/2010 | Matsushita | F03D 80/60 290/44 |
| 2010/0140952 A1 | 6/2010 | Jansen | |
| 2013/0009405 A1* | 1/2013 | Sato | F03D 9/25 290/55 |

FOREIGN PATENT DOCUMENTS

| | | |
|---|---|---|
| CN | 101672255 A | 3/2010 |
| CN | 101888148 A | 11/2010 |
| CN | 102828920 A | 12/2012 |
| CN | 104791197 A | 7/2015 |
| EP | 2000668 A1 | 12/2008 |
| WO | 2006032515 A1 | 3/2006 |

OTHER PUBLICATIONS

Heat Balance Research on 3 MW Marine Wind Turbine's Engine Room,Oct. 31, 2011, vol. 33 , pp. 854-857.
International Search Report for PCT/CN2016/073513, dated Apr. 28, 2016, ISA/CN.
Zhou, Nianyong et al., "Heat Balance Research on 3MW Marine Wind Turbine's Engine Room", World Sci-Tech R& D, vol. 33, No. 5, Oct. 31, 2011 (Oct. 31, 2011), pp. 854-857.

* cited by examiner

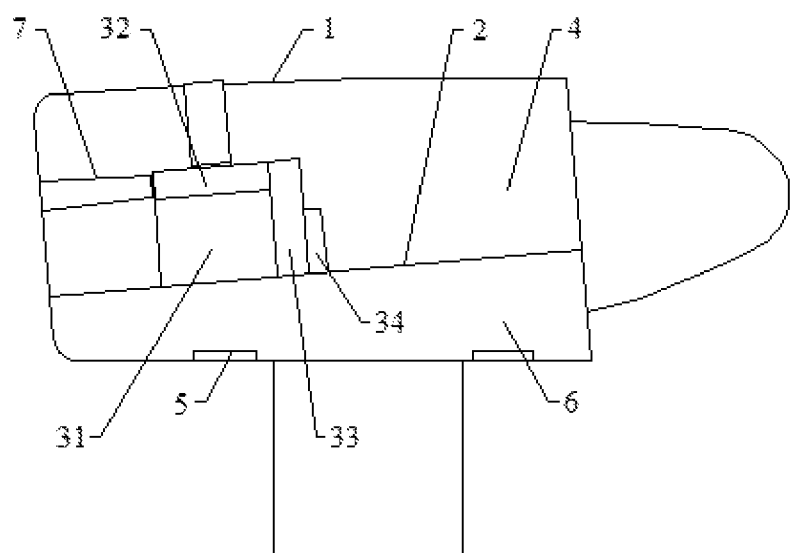

WIND POWER GENERATION GROUP COOLING SYSTEM DESIGN METHOD AND COOLING SYSTEM FOR HARSH ENVIRONMENT

This application is the national phase of International Application No. PCT/CN2016/073513, titled "WIND POWER GENERATION GROUP COOLING SYSTEM DESIGN METHOD AND COOLING SYSTEM FOR HARSH ENVIRONMENT", filed on Feb. 4, 2016, which claims the benefit of priority to Chinese patent application No. 201510097596.6 titled "DESIGN METHOD OF HEAT DISSIPATION SYSTEM OF WIND GENERATOR SYSTEM AND HEAT DISSIPATION SYSTEM FOR SEVERE ENVIRONMENTS", filed with the Chinese State Intellectual Property Office on Mar. 5, 2015 the entire disclosures of which are incorporated herein by reference.

FIELD

The present application relates to the field of wind power generation, and particularly to a design method of a heat dissipation system of a wind generator system and a heat dissipation system for severe environments.

BACKGROUND

The "thirteenth Five-Year Plan" in all the fields of new energy are being drew up, wind power will gradually change its current status of being widely regarded as an "alternative energy", to play a main role in the national energy structure adjustment in the future. According to planning ideas, in the period of "thirteenth Five-Year Plan", the domestic newly-increased wind power capacity will reach 100 million Kilowatts, and the annual average newly-increased wind power capacity will reach 20 million Kilowatts, in which, the wind power capacity of the "Three-North" large-scale wind power base will be increased by 60 million Kilowatts in five years, and the wind power capacity of the middle and low-speed wind resource region in the Mid-eastern China will be increased by 30 million Kilowatts, and the wind power capacity of the offshore wind power will be increased by 10 million Kilowatts.

Areas rich in wind energy resources are mainly concentrated in the Three-North regions (Northeast China, North China, Northwest China), coastal regions and islands. Currently, domestic installed wind power generator systems are mainly concentrated in the Three-North regions, and deserts, gobi and desertified lands throughout the country are also mainly distributed in the Three-North regions. The Three-North regions have severe environments, and greatly adversely affect the operation of wind power generator systems, for example, sand storm, flying flocculus, flying dust, and coal ash and dust in partial regions caused by industrial emission will adversely affect the normal use of radiators of components (including a gear box, a generator, a frequency converter, a control cabinet and etc.) of a wind generator system. It is embodied in that, suspended substances (flying flocculus, flying dust, coal ash and etc.) will be absorbed at the suction opening of the radiator, and after a long time operation, the suspended substances absorbed at the suction opening will be continuously increased, which may reduce the intake air amount of cold air of the radiator, thus a required cooling effect cannot be achieved, which adversely affects the normal operation of the generator system.

SUMMARY

In view of this, an object of the present application is to provide a design method of a heat dissipation system of a wind generator system and a heat dissipation system for severe environments, which can prevent a suction opening of a radiator of each of components of the wind generator system from being blocked, thereby ensuring the cooling effect, and meeting the usage requirements under the severe environments.

According to the present application, the above issues are addressed by the following technical solutions: a design method of a heat dissipation system of a wind generator system for severe environments, includes the following steps:

(1) constructing an outer air duct of the heat dissipation system: forming the outer air duct of the heat dissipation system in spaces between a nacelle housing of the wind generator system and radiators of components of the wind generator system;

(2) determining a suction air amount of the outer air duct: the suction air amount Q is the sum of cooling air amounts required by the radiators for reaching respective rated cooling temperatures;

(3) determining an air velocity $V_0$ at an air inlet of the outer air duct: setting $V_0$=3 m/s to 4 m/s;

(4) determining an area of the air inlet of the outer air duct: the area of the air inlet is $A=Q/V_0$; and (5) providing the air inlet: providing the air inlet in the nacelle housing, to ensure that the area of the air inlet is not less than A.

Further, the method includes, in step (5), providing the air inlet at a bottom or a tail of the nacelle housing, forming a settling chamber between the air inlet and suction openings of the radiators, and determining a relationship between a minimum particle diameter of suspended substances that are allowed to be collected 100% and dimension and structure of the settling chamber, and wherein the determination process is as follows:

a retention time of an air flow in the settling chamber is $t_1=l/v_1$ (s), where l is a length (m) of the settling chamber, $v_1$ is a moving speed (m/s) of the air flow in the settling chamber; a time required for the suspended substances with a settling velocity Vs to fall from a top of the settling chamber to a bottom of the settling chamber is $t_2=H/v_s$ (s), where H is a height of the settling chamber; according to the above relationships, to completely collect the suspended substances in the settling chamber, it is required to meet the condition: $l/v_1 \geq H/v_s$, and further according to the condition $v_s=[gp_1d^2]/18^\mu$, the relationship formula between the minimum particle diameter of the suspended substances that are allowed be collected 100% and the dimension and structure of the settling chamber is $d^2_{min}=18^\mu H v_1/gp_1 l$, where $^\mu$ is a dynamic viscosity of air, g is gravity acceleration, $p_1$ is a density of the suspended substances.

A heat dissipation system of a wind generator system is further disclosed according to the present application. The heat dissipation system includes a nacelle housing, a frame is provided in the nacelle housing, radiators of the components of the wind generator system are arranged above the frame, an outer air duct is formed by spaces between the nacelle housing and the radiators, an air inlet of the outer air duct is provided at a bottom of the nacelle housing, and a settling chamber is provided below the frame.

Further, the radiators include a gearbox radiator, a generator radiator, a frequency converter radiator and a control cabinet radiator.

Further, at least one of the gearbox radiator, the generator radiator, the frequency converter radiator and a control cabinet radiator is in communication with an outside of the nacelle housing via an independent air inlet duct, to meet the requirement for the area of the air inlet of the outer air duct.

Further, a sectional area of the air inlet duct is gradually decreased in an air intake direction.

The Present Application has the Following Beneficial Effects:

1) With the five steps of constructing the outer air duct of the heat dissipation system, determining the suction air amount of the outer air duct, determining the air velocity at the air inlet of the outer air duct, determining the area of the air inlet of the outer air duct, and providing the air inlet, the original heat dissipation system of the wind generator system is additionally provided with the outer air duct. Further, the area of the air inlet is controlled to allow the air velocity at the air inlet to be 3 m/s to 4 m/s, thus rare or no suspended substances are suctioned into the outer air duct, and the radiators of the original heat dissipation system suction cooling air from the outer air duct, therefore, the suction openings of the radiators will not be blocked, thus ensuring the intake air amount of cooling air and the heat dissipation effect, to allow the wind generator system to meet the usage requirements under severe environments.

2) The settling chamber is formed between the air inlet and the suction openings of the radiators, and then the structure and dimension of the settling chamber are designed according to the size of the particle diameter of the suspended substances at the installation site of the wind generator system and the relationship formula between the minimum particle diameter of the suspended substances that can be collected 100% and the dimension and structure of the settling chamber, to enable the suspended substances to be collected 100% by the settling chamber, thereby further avoiding the suction openings of the radiators from being blocked.

BRIEF DESCRIPTION OF THE DRAWINGS

The present application is further described below with reference to the drawing and embodiments.

FIG. 1 is a schematic view showing the structure of the present application.

DETAILED DESCRIPTION

The present application is described in detail hereinafter with reference to the drawing and embodiments.

First Embodiment

A design method of a heat dissipation system of a wind generator system for severe environments, includes the following steps:

(1) constructing an outer air duct of the heat dissipation system: the outer air duct of the heat dissipation system is formed in spaces between a nacelle housing of the wind generator system and radiators of components of the wind generator system, and the components of the wind generator system includes a gear box, a generator, a frequency converter and a control cabinet;

(2) determining a suction air amount of the outer air duct: the suction air amount Q is the sum of cooling air amounts required by the radiators for reaching respective rated cooling temperatures, wherein, cooling air amounts required by the radiator of the gear box, the radiator of the generator, the radiator of the frequency converter, and the radiator of the control cabinet for reaching respective rated cooling temperatures are respectively: Q1, Q2, Q3, and Q4, and Q=Q1+Q2+Q3+Q4;

(3) setting an air velocity of an air inlet of the outer air duct $V_0$=3.8 m/s;

(4) determining an area of the air inlet of the outer air duct: the obtained area of the air inlet is A=Q/$V_0$;

(5) providing the air inlet: the air inlet is provided at the bottom of the nacelle housing, and the area of the air inlet is ensured to be not less than A; and (6) designing a settling chamber: the settling chamber is formed between the air inlet and a suction opening of each of the radiators, and a relationship between a minimum particle diameter of suspended substances that can be collected 100% and the dimension and structure of the settling chamber is determined, and the specific determination process is described as follows.

A retention time of an air flow in the settling chamber is $t_1$=l/$v_1$(s), where l is the length (m) of the settling chamber, $v_1$ is a moving speed (m/s) of the air flow in the settling chamber; a time required for the suspended substances with a settling velocity Vs to fall from a top of the settling chamber to a bottom of the settling chamber is $t_2$=H/$v_s$(s), where H is the height of the settling chamber. According to the above relationships, to completely collect the suspended substances in the settling chamber, it is required to meet the condition: l/$v_1 \geq$H/$v_s$, and further according to the hydromechanics, $v_s$[g$p_1d^2$]/18$^\mu$, thus the relationship formula between the minimum particle diameter of the suspended substances that can be collected 100% and the dimension and structure of the settling chamber is $d^2_{min}$=18$^\mu$H$v_1$/g$p_1$l, where $^\mu$ is a dynamic viscosity of air, g is gravity acceleration, $p_1$ is a density of the suspended substances. Then, the structure and dimension of the settling chamber are designed according to the size of the particle diameter of the suspended substances at the installation site of the wind generator system and the relationship formula between the minimum particle diameter of the suspended substances that can be collected 100% and the dimension and structure of the settling chamber, to enable the suspended substances to be collected 100% by the settling chamber.

Second Embodiment

A design method of a heat dissipation system of a wind generator system for severe environments, includes the following steps:

(1) constructing an outer air duct of the heat dissipation system: the outer air duct of the heat dissipation system is formed in spaces between a nacelle housing of the wind generator system and radiators of components of the wind generator system, and the components of the wind generator system includes a generator, a frequency converter and a control cabinet;

(2) determining a suction air amount of the outer air duct: the suction air amount Q is the sum of cooling air amounts required by the radiators for reaching respective rated cooling temperatures, wherein, cooling air amounts required by the radiator of the generator, the radiator of the frequency converter, and the radiator of the control cabinet for reaching respective rated cooling temperatures are respectively: Q2, Q3, and Q4, and Q=Q2+Q3+Q4;

(3) setting an air velocity of an air inlet of the outer air duct V0=3 m/s.

(4) determining an area of the air inlet of the outer air duct: the obtained area of the air inlet is A=Q/$V_0$;

(5) providing the air inlet: the air inlet is provided at the tail of the nacelle housing, and the area of the air inlet is ensured to be not less than A; and (6) designing a settling chamber: the settling chamber is formed between the air inlet and a suction opening of each of the radiators, and a relationship between a minimum particle diameter of suspended substances that can be collected 100% and the dimension and structure of the settling chamber is determined, and the specific determination process is described as follows.

A retention time of an air flow in the settling chamber is $t_1=l/v_1(s)$, where l is the length (m) of the settling chamber, $v_1$ is a moving speed (m/s) of the air flow in the settling chamber; a time required for the suspended substances with a settling velocity Vs to fall from a top of the settling chamber to a bottom of the settling chamber is $t_2=H/v_s(s)$, where H is the height of the settling chamber. According to the above relationships, to completely collect the suspended substances in the settling chamber, it is required to meet the condition: $l/v_1 \geq H/v_s$, and further according to the condition $v_s=[gp_1d^2]/18^\mu$, the relationship formula between the minimum particle diameter of the suspended substances that can be collected 100% and the dimension and structure of the settling chamber is $d^2_{min}=18^\mu H v_1/gp_1 l$, where $^\mu$ is a dynamic viscosity of air, g is gravity acceleration, $p_1$ is a density of the suspended substances. Then, the structure and dimension of the settling chamber are designed according to the size of the particle diameter of the suspended substances at the installation site of the wind generator system and the relationship formula between the minimum particle diameter of the suspended substances that can be collected 100% and the dimension and structure of the settling chamber, to enable the suspended substances to be collected 100% by the settling chamber.

A heat dissipation system of a wind generator system obtained by the above method has the following advantages.

1) With the four steps of constructing the outer air duct of the heat dissipation system, determining the suction air amount of the outer air duct, determining the area of the air inlet of the outer air duct, and providing the air inlet, the original heat dissipation system of the wind generator system is additionally provided with the outer air duct. Further, the area of the air inlet is controlled to allow the air velocity at the air inlet to be 3 m/s to 4 m/s, thus rare or no suspended substances are suctioned into the outer air duct, and the radiators of the original heat dissipation system suction cooling air from the outer air duct, therefore, the suction openings of the radiators will not be blocked, thus ensuring the intake air amount of cooling air and the heat dissipation effect, to allow the wind generator system to meet the usage requirements under severe environments.

2) The settling chamber is formed between the air inlet and the suction openings of the radiators, and then the structure and dimension of the settling chamber are designed according to the size of the particle diameter of the suspended substances at the installation site of the wind generator system and the relationship formula between the minimum particle diameter of the suspended substances that can be collected 100% and the dimension and structure of the settling chamber, to enable the suspended substances to be collected 100% by the settling chamber, thereby further avoiding the suction openings of the radiators from being blocked.

A heat dissipation system of a wind generator system is further provided according to the present application, as shown in FIG. 1, the heat dissipation system includes a nacelle housing 1. A frame 2 is provided in the nacelle housing, radiators of the components of the wind generator system are arranged above the frame, an outer air duct 4 is formed in the spaces between the nacelle housing and the radiators, an air inlet 5 of the outer air duct is provided at the bottom of the nacelle housing, and a settling chamber 6 is provided below the frame. With the combined action of the outer air duct and the settling chamber, the heat dissipation system of the wind generator system can prevent the suction opening of each of the radiators from being blocked by suspended substances, thereby ensuring the heat dissipation effect, and allowing the wind generator system to meet the usage requirements under severe environments.

As a further improvement of the above technical solutions, the radiators include a gearbox radiator 31, a generator radiator 32, a frequency converter radiator 33 and a control cabinet radiator 34, and at least one of the gearbox radiator, the generator radiator, the frequency converter radiator and the control cabinet radiator is in communication with the outside of the nacelle housing via an independent air inlet duct 7. The radiators may further include other radiators well known to the public, and may also not include the gearbox radiator. Configuring the radiator to be in communication with the outside of the nacelle housing via the independent air inlet duct is to allow the dimension of the bottom of the nacelle housing to meet the requirement of providing the air inlet. For example, if the suction air amount determined by the sum of the cooling air amounts required by the radiators to reach rated cooling temperatures is too large, a very large air inlet needs to be provided to meet the requirement, however, the bottom of the nacelle housing does not have sufficient dimension for providing the suction opening, and in this case, the independent air inlet duct is adopted.

As a further improvement of the above technical solutions, the sectional area of the air inlet duct is gradually decreased in an air intake direction. With the cross sectional area of the air inlet duct being gradually decreased in the air intake direction, the air velocity is gradually increased, which can effectively prevent the suspended substances from adhering or being retained on the inner wall of the cooling air duct.

It is to be noted finally that, the above embodiments are only intended to illustrate technical solutions of the present application rather than limit the present application. Though the present application is described in detail with reference to the preferred embodiments, it should be appreciated by the person skilled in the art that, a few of modifications or equivalent substitutions may be made to the technical solutions of the present application without departing from the purpose and scope of the technical solutions of the present application, and these modifications or equivalent substitutions are also deemed to fall into the scope of the present application defined by the claims.

The invention claimed is:

1. A design method of a heat dissipation system of a wind generator system for severe environments, comprising the following steps:
   (1) constructing an outer air duct of the heat dissipation system: forming the outer air duct of the heat dissipation system in spaces between a nacelle housing of the wind generator system and radiators of components of the wind generator system;
   (2) determining a suction air amount of the outer air duct: the suction air amount Q is the sum of cooling air amounts required by the radiators for reaching respective rated cooling temperatures;
   (3) determining an air velocity $V_0$ at an air inlet of the outer air duct;

(4) determining a designed area of the air inlet of the outer air duct;

(5) providing the air inlet: providing the air inlet in the nacelle housing; and wherein the designed area of the air inlet equals to $Q/V_0$, and an area of the air inlet is not less than the designed area of the air inlet.

2. The method according to claim 1, further comprising, in step (5), providing the air inlet at a bottom or a tail of the nacelle housing, forming a settling chamber between the air inlet and a suction opening of each of the radiators, and determining a relationship between a minimum particle diameter of suspended substances that are allowed to be collected 100% and dimension and structure of the settling chamber, and wherein the determination process is as follows:

a retention time of an air flow in the settling chamber is $t_1 = l/v_1(s)$, where l is a length (m) of the settling chamber, $v_1$ is a moving speed (m/s) of the air flow in the settling chamber; a time required for the suspended substances with a settling velocity Vs to fall from a top of the settling chamber to a bottom of the settling chamber is $t_2 = H/v_s(s)$, where H is a height of the settling chamber; according to the above relationships, to completely collect the suspended substances in the settling chamber, it is required to meet the condition: $l/v_1 \geq H/v_s$, and further according to the condition $v_s = [gp_1 d^2]/18^\mu$, the relationship formula between the minimum particle diameter of the suspended substances that are allowed be collected 100% and the dimension and structure of the settling chamber is $d^2_{min} = 18^\mu Hv_1/gp_1 l$, where $\mu$ is a dynamic viscosity of air, g is gravity acceleration, $p_1$ is a density of the suspended substances.

3. A heat dissipation system of a wind generator system obtained by applying the method according to claim 1, the heat dissipation system comprising a nacelle housing, wherein a frame is provided in the nacelle housing, radiators of the components of the wind generator system are arranged above the frame, an outer air duct is formed by spaces between the nacelle housing and the radiators, an air inlet of the outer air duct is provided at a bottom of the nacelle housing, and a settling chamber is provided below the frame.

4. The heat dissipation system of the wind generator system according to claim 3, wherein the radiators comprise a gearbox radiator, a generator radiator, a frequency converter radiator and a control cabinet radiator.

5. The heat dissipation system of the wind generator system according to claim 4, wherein at least one of the gearbox radiator, the generator radiator, the frequency converter radiator and a control cabinet radiator is in communication with an outside of the nacelle housing via an independent air inlet duct.

6. The heat dissipation system of the wind generator system according to claim 5, wherein a sectional area of the air inlet duct is gradually decreased in an air intake direction.

7. A heat dissipation system of a wind generator system obtained by applying the method according to claim 2, the heat dissipation system comprising a nacelle housing, wherein a frame is provided in the nacelle housing, radiators of the components of the wind generator system are arranged above the frame, an outer air duct is formed by spaces between the nacelle housing and the radiators, an air inlet of the outer air duct is provided at a bottom of the nacelle housing, and a settling chamber is provided below the frame.

8. The heat dissipation system of the wind generator system according to claim 7, wherein the radiators comprise a gearbox radiator, a generator radiator, a frequency converter radiator and a control cabinet radiator.

9. The heat dissipation system of the wind generator system according to claim 8, wherein at least one of the gearbox radiator, the generator radiator, the frequency converter radiator and a control cabinet radiator is in communication with an outside of the nacelle housing via an independent air inlet duct.

10. The heat dissipation system of the wind generator system according to claim 9, wherein a sectional area of the air inlet duct is gradually decreased in an air intake direction.

\* \* \* \* \*